3,341,304
SEPARATION OF URANIUM FROM URANIUM DIOXIDE-ZIRCONIUM DIOXIDE MIXTURES
Billie J. Newby, Idaho Falls, Idaho, assignor to the United States of America as represented by the United States Atomic Energy Commission
No Drawing. Filed Apr. 8, 1966, Ser. No. 541,401
10 Claims. (Cl. 23—324)

ABSTRACT OF THE DISCLOSURE

A method of separating uranium from mixtures of uranium dioxide and zirconium dioxide by reacting the dioxide mixture with boiling concentrated hydrofluoric acid or acid mixtures containing boiling concentrated hydrofluoric acid and at least catalytic amounts of copper and/or nickel ions, whereby the zirconium is dissolved and the uranium remains as solid, hydrated uranium tetrafluoride.

---

The invention described herein was made in the course of or under, a contract with the United States Atomic Energy Commission.

This invention concerns a method of separating uranium values from a mixture of uranium and zirconium dioxides. More particularly, the invention relates to reclaiming unused uranium from a uranium dioxide-zirconium dioxide fuel clad in Zircaloy.

Generally, the amount of nuclear fuel used before a fuel element is changed constitutes only a small percentage of the fuel in the element, thereby necessitating the recovery of the unused fuel. Where the fuel element consists of uranium metal and Zircaloy, one of the reclaiming methods entails the steps of dissolving the Zircaloy cladding and uranium metal in dilute hydrofluoric acid and reducing the fluoride ion concentration in the resulting solutions by complexing with aluminum nitrate and chromic acid and thereafter extracting the uranium with tributyl phosphate in a proper diluent.

Ideally, the acid-waste solutions should not contain an appreciable quantity of uranium, so they may be removed without further processing. As fuels are developed which require different dissolving techniques, new methods of reclaiming unused uranium must be developed. One such fuel contains zirconium dioxide as well as uranium dioxide, and this addition of zirconium dioxide and uranium dioxide changes the reclaiming procedure drastically. Not only does a fuel composed of zirconium dioxide and uranium dioxide require stronger reagents and longer processing than a fuel containing only uranium dioxide, but an additional step is required to separate zirconium dioxide from uranium dioxide. Because of the more severe conditions, enough uranium dissolves into the waste solutions to make their reprocessing an economic necessity.

When a sufficient quantity of concentrated hydrofluoric acid is used to dissolve a uranium dioxide-zirconium dioxide fuel and that solution is combined with the solution obtained from dissolving the Zircaloy-clad material in dilute hydrofluoric acid, the resulting mixture is high in fluoride concentration and low in zirconium concentration. Excessive concentrations of fluoride ion in these solutions cause corrosion of the equipment; therefore, the fluoride ion concentration must be carefully controlled before reprocessing for uranium values. During the reclaiming process, the uranium must be in a particular valence state for extraction by tributyl phosphate, and the solution must be regulated so that the uranium values favor the organic phase rather than the aqueous phase. Large fluoride ion concentrations prevent the necessary adjustments for a successful tributyl phosphate extraction.

One of the methods explored to remedy the situation consisted of dissolving scrap zirconium in the solution in order to increase the zirconium concentration, but this resulted in partial precipitation of the uranium. Efforts to decrease the fluoride concentration by stream stripping resulted in partial precipitation of the uranium and corrosion of the equipment. Another method investigated was the addition of sufficient aluminum nitrate to complex the fluoride present in the solution prior to the extraction of the uranium by tributyl phosphate; however, excessively large volumes of aluminum fluoride wastes resulted, so that this process like the others was unacceptable.

E. I. du Pont de Nemours and Company's "Teflon," a tetrafluoroethylene plastic, was used for the equipment in the initial experiments with a zirconium dioxide-uranium dioxide fuel. It was found that the hydrofluoric acid dissolution of both the Zircaloy and the zirconium dioxide also dissolved such quantities of uranium that both of these waste solutions had to be processed and the above-referred-to difficulties were encountered. Some experiments were then carried out in equipment manufactured from International Nickel Company's "Monel," a corrosion-resistant nickel-copper alloy. Very unexpectedly, it was found that the reacton of uranium dioxide and zirconium dioxide fuel with concentrated hydrofluoric acid produced a solution in which the zirconium was completely dissolved and the uranium was converted to the insoluble three-quarter hydrate uranium tetrafluoride. Such a result was completely unpredictable. In searching for the answer to this unexpected result, analysis of the acid solutions determined that the "Monel" containers contributed nickel and copper ions to the acid solution, and it is believed these ions acted to maintain the uranium in the plus four valence state such that the zirconium dissolved while the uranium remained in solid form. Further experiments were then conducted in "Teflon" equipment, wherein the zirconium dioxide-uranium dioxide fuel was dissolved in boiling concentrated hydrofluoric acid in the presence of copper, nickel and a combination of copper and nickel ions. Similar results were obtained as in those experfiments in the "Monel" equipment.

The waste solutions from the decladding reaction as well as the following zirconium dioxide dissolution step still contained too much uranium. By adding potassium fluoride to both the dilute hydrofluoric acid for the decladding step and the concentrated hydrofluoric acid for the zirconium dioxide dissolution step, it was found that in both cases substantially less uranium dissolved. This was also surprising as potassium fluoride had been used previously to precipitate uranium tetrafluoride as $KUF_5$ or $K_2UF_6$, but never to inhibit uranium loss from partially dissolved fuel. The following examples will help to explain the invention.

EXAMPLE I

Samples of uranium dioxide-zirconium dioxide were reacted with various combinations of boiling acids in "Teflon" equipment. Over a period of several hours the entire sample was dissolved, and no separation of the uranium values from the zirconium occurred. The resulting solutions are those discussed earlier were uranium separtion is difficult because of the high fluoride ion concentrations. The combinations of acids used were 10 M hydrofluoric acid-0.1 M chromic acid and 20 to 28 M hydrofluoric acid-0.03 M nitric acid.

EXAMPLE II

Five 6.6-gram portions of uranium dioxide-zirconium dioxide fuel clad in Zircaloy were declad in batch reaction with 11 ml. of 5 M hydrofluoric acid per gram of fuel. In three of the batches potassium fluoride solutions were added up to molar concentrations of 0.05, 0.09, and 0.125, and two of the batches contained no potassium fluoride. In each case the reaction was allowed to take place without external heat for 15 minutes at a temperature of 70° C. The solutions were then heated at or near the boiling point for one hour and the contents thereafter were allowed to remain at room temperature for 24 hours. The first 75 minutes of each reaction were performed in "Monel" equipment under an insert nitrogen atmosphere. Thereafter the reaction mixture was transferred to a capped "Teflon" container for the remaining digestion period. The results are summarized in Table I.

TABLE I

| KF, M | Zr from Cladding, M | | Uranium Loss to Decladding Solution, percent by weight | |
|---|---|---|---|---|
|  | 15 min. at 70° C. | 60 min. at 96° C. | 15 min. at 70° C. | 60 min. at 96° C. |
| 0.0 | ------ | 0.78 | ------ | 0.57 |
| 0.0 | 0.79 | ------ | 0.06 | ------ |
| 0.05 | 0.78 | 0.90 | 0.04 | 0.68 |
| 0.09 | 0.70 | 0.78 | 0.02 | 0.49 |
| 0.125 | 0.65 | 0.68 | 0.009 | 0.30 |

The results showed that for all three levels of potassium fluoride concentration, the first 15 minutes of decladding produced no appreciable attack of the uranium dioxide-zirconium dioxide fuel, as the uranium lost to the decladding solution was in the range of 0.04 to 0.009 weight percent for all three solutions. During the boiling step as much as 0.68 weight percent of the uranium was lost to the decladding solution with 0.05 M potassium fluoride, and 0.49 weight percent of the uranium dissolved in the solution with 0.09 M potassium fluoride. These losses need not occur because satisfactory decladding was achieved in the first 15 minutes while keeping the temperature below 70° C.

EXAMPLE III

Uranium dioxide-zirconium dioxide was dissolved in the presence of catalytic amounts of nickel of copper ions or a combination of both by the following boiling acid or acid mixtures: 20 M hydrofluoric acid, 20 M hydrofluoric acid-0.03 M nitric acid, 15 M hydrofluoric acid-0.2 M oxalic acid-0.37 M boric acid, 10 M hydrofluoric acid-0.37 M boric acid-0.1 M chromic acid, to form the insoluble three-quarter hydrate tetrafluoride, while the dissolved zirconium dioxide remained in solution.

Six 0.94-gram portions of uranium dioxide-zirconium dioxide were each boiled with 100 ml. of 20 M hydrofluoric acid-0.37 M boric acid for 2.5 hours in "Monel" equipment under a nitrogen atmosphere. Three of the solutions contained no potassium fluoride, while the others contained molar concentrations of 0.05, 0.09 or 0.125. The solution and solids were then transferred to a capped "Teflon" container where they remained for an additional 21.5 hours at room temperature. The results are summarized in Table II.

TABLE II

| Run | Temp., ° C. | KF, M | Percent by Weight Uranium Loss to Leach Solution | | | |
|---|---|---|---|---|---|---|
|  |  |  | 1 hr. | 1.5 hr. | 2 hr. | 2.5 hr. |
| 1 | 96 | 0 | ------ | ------ | 0.2 | ------ |
| 2 | 96 | 0 | ------ | ------ | 0.23 | ------ |
| 3 | 96 | 0 | ------ | ------ | 0.04 | ------ |
| 4 | 96 | 0.05 | 0.05 | 0.05 | 0.05 | 0.01 |
| 5 | 96 | 0.09 | 0.03 | 0.03 | 0.03 | 0.05 |
| 6 | 96 | 0.125 | ------ | 0.03 | 0.03 | 0.03 |

The results show that the addition of potassium fluoride sufficiently suppresses the uranium solubility, and the uranium loss seemed independent of both the potassium fluoride concentration over the range tested and the contact time.

EXAMPLE IV

The insoluble three-quarter hydrate uranium tetrafluoride formed in the above experiment was dissolved by two separate acid solutions. In both experiments chromic acid was used and was equal to the volume of 20 M hydrofluoric acid used in the above experiment. One solution contained only 0.1 M chromic acid, the other solution contained 0.1 M chromic acid and 0.37 M boric acid. Both acid solutions dissolved the entire uranium residue.

It will be understood that the invention is not to be limited to the details given herein but that it may be modified within the scope of the appended claims.

What is claimed is:

1. A method for separating uranium values from a mixture of uranium dioxide and zirconium dioxide, comprising:
    (a) contacting said dioxide mixture with boiling concentrated hydrofluoric acid or any of the following acids or acid mixtures in combination with boiling concentrated hydrofluoric acid: oxalic and boric acids, chromic and boric acids, boric acid, or nitric acid, in the presence of copper ions, nickel ions or a mixture of copper and nickel ions under an inert atmosphere, whereby the zirconium dioxide is dissolved by said acid or acid mixture solution and the uranium remains as hydrated uranium tetrafluoride, and
    (b) separating the solid from the acid solution.

2. The method of claim 1 wherein potassium fluoride is present in an amount not less than about 0.05 molar and the hydrofluoric acid is from about 10 to 30 molar.

3. The method of claim 2 wherein the acid mixture is about 20 molar in hydrofluoric acid and about 0.37 molar in boric acid.

4. The method of claim 2 wherein the acid or acid mixture contacting step is performed in equipment made of a copper-nickel alloy for about two hours.

5. A method for recovering uranium values from nuclear fuels containing uranium dioxide and zirconium dioxide clad in a zirconium alloy containing minor amounts of tin, iron, chromium and nickel comprising:
    (a) contacting said clad fuel with dilute hydrofluoric acid for about 15 minutes at a temperature not in excess of about 70° C., whereby a zirconium alloy containing minor amounts of tin, iron, chromium and nickel cladding is dissolved by the dilute hydrofluoric acid solution;
    (b) separating the remaining solid fuel from the dilute hydrofluoric acid solution;
    (c) contacting said solid fuel with boiling concentrated hydrofluoric acid or any of the following acids or acid mixtures in combination with boiling concentrated hydrofluoric acid: oxalic and boric acids, chromic and boric acids, boric acid, or nitric acid, in the presence of copper ions, nickel ions, or a mixture of copper and nickel ions for about two hours under an inert atmosphere, whereby the zirconium dioxide is dissolved by said acid or acid mixture solution and the uranium remains as hydrated uranium tetrafluoride;
    (d) separating the hydrated uranium tetrafluoride from the acid solution; and
    (e) dissolving the hydrated uranium tetrafluoride with boiling chromic acid or a boiling mixture of chromic and boric acids prior to separating the uranium values by well-known means.

6. The method of claim 5 wherein the dilute hydrofluoric acid is about 5 molar and potassium fluoride is added to a concentration of no less than about 0.05 molar.

7. The method of claim 5 wherein potassium fluoride is present in the concentrated acid or acid mixtures to a concentration of no less than about 0.05 molar and the hydrofluoric acid is from about 10 to 30 molar.

8. The method of claim 5 wherein the chromic acid in the uranium tetrafluoride dissolving step is about 0.1 molar.

9. The method of claim 5 wherein the zirconium dioxide dissolution step is carried out in equipment made of a copper-nickel alloy.

10. A method for recovering uranium values from nuclear fuels containing uranium dioxide and zirconium dioxide clad in a zirconium alloy containing minor amounts of tin, iron, chromium and nickel, comprising:
  (a) contacting said clad fuel with 5 molar hydrofluoric acid for 15 minutes at a temperature not in excess of 70° C., in the presence of potassium fluoride at a concentration of no less than 0.05 molar, whereby a zirconium alloy containing minor amounts of tin, iron, chromium and nickel cladding is dissolved by the hydrofluoric acid solution;
  (b) separating the remaining solid fuel from the hydrofluoric acid solution;
  (c) contacting said solid fuel, in the presence of potassium fluoride at a concentration of no less than 0.05 molar, with a boiling acid mixture 20 molar in hydrofluoric acid and 0.37 molar in boric acid, in equipment made of a copper-nickel alloy, for two hours under a nitrogen atmosphere, whereby the zirconium dioxide is dissolved by said acid mixture and the uranium remains as three-quarter hydrate uranium tetrafluoride;
  (d) separating the three-quarter hydrate uranium tetrafluoride from the acid mixture; and
  (e) dissolving the three-quarter hydrate uranium tetrafluoride with boiling 0.1 molar chromic acid prior to separating the uranium values by well-known means.

References Cited

Miller: Zirconium, 2nd edition, London, Butterworth's Scientific Publications (1957), page 240.

Reactor Fuel Processing, vol. 7, No. 2, page 89 (1964).

CARL D. QUARFORTH, *Primary Examiner.*

S. TRAUB, R. L. GRUDZIECKI, *Assistant Examiners.*